Patented Feb. 2, 1932

1,843,616

UNITED STATES PATENT OFFICE

ANTON MACKERT, OF FRANKFORT-ON-THE-MAIN, GERMANY

METHOD FOR REGENERATING GRANULAR ACTIVE CHARCOAL

No Drawing. Application filed December 21, 1928, Serial No. 327,746, and in Germany December 24, 1927.

This invention relates to a method for regenerating granular active charcoal by heating or treating the spent adsorbents with hot flushing gases, thus driving off the adsorbed substances and making the spent charcoal ready for adsorption again. In many cases, especially in the adsorption of benzene from illuminating or coke oven gases the above described process is incomplete and after each regeneration some of the adsorbed substances are kept back on the adsorbent which is gradually enriched with these substances, thus decreasing the adsorptive power of the adsorbents. Therefore the charcoal loaded with these adsorbed substances has to be subjected to a very intensive regeneration treatment after some time.

According to the invention this intensive regeneration of spent granular charcoal is carried out by treating the mass of the spent adsorbent without agitation of the mass, continuously with gas mixtures having a low oxygen content and at temperatures insufficient for effecting a substantial combustion of the adsorbent, thus driving off and/or oxidizing the adsorbed impurities without substantial losses of carbon, which in a certain degree acts as catalyst in the combustion of the impurities. It is not necessary to move the charcoal during this regeneration treatment. Only in continuous operation the whole mass of the charcoal is moved, but motion of the single charcoal granules with respect to each other is avoided.

The new regeneration treatment according to the invention, in which a continuous motion of the individual charcoal granules such as mechanical stirring of the charcoal layer is avoided has considerable importance, as the maintenance of the size of the individual charcoal granules during the regeneration is very important in adsorption methods with granular charcoal and alternating adsorption and regeneration.

The oxygen concentrations and the velocity of flow of the gaseous treating media, the temperature of the charcoal during the regeneration treatment and the temperature of the treating gases depend upon the kind of the active charcoal to be regenerated and upon the kind and amounts of impurities to be removed. Oxygen concentrations and treating temperatures are dependent on each other, as higher oxygen concentrations require lower treating temperatures and lower oxygen concentrations higher treating temperatures.

It is generally of advantage to use gas mixtures the oxygen content of which is below 10% by volume, for example 2 to 8%. Mixtures of air and steam, which may contain other gases or gas mixtures such as combustion gases have proved to be suitable.

The regeneration may be carried out in simple containers or in the containers used for the adsorption themselves. Atmospheric pressure and pressures below and above atmospheric pressure may be applied; the oxygen concentration and the treating temperature have to be suited to the pressure used.

When working according to the invention the granular charcoal to be regenerated may be brought into a simple cylindrical vessel provided with exterior insulation against radiation of heat; the oxygen-containing treating gases, for example steam, are then passed through the resting charcoal layer for example, in the direction from the bottom to the top. Only the bottom parts of the charcoal layer have previously to be brought to the temperature, at which the oxidation of the impurities coming in contact with the oxygen-containing treating gases starts. As soon as this oxidation has started the temperature in the interior of the charcoal layer is gradually raised, as the oxidation process is exothermic. The oxygen content of the treating gases may then be regulated in such a manner, that only the impurities and substantially no charcoal is oxidized. Surprisingly low temperatures are sufficient for starting the regeneration. Thus for example when passing at the start of the regeneration oxygen free superheated steam of about 180° C. through the charcoal layer and adding about 20% by volume of air to the steam when the bottom parts of the charcoal layer have attained the temperature of the superheated steam, the oxidation of the impurities sets in at once, thereby raising quickly the temperature in the interior of the charcoal layer. There is then formed in the charcoal layer a reaction zone with a high temperature of for example 500 to 600° C., which is slowly moving in the direction of flow of the treating gases. In the zones of the charcoal layer, in which the regeneration is finished, the temperature is slowly decreased, as the waste heat is transferred upon the treating gases passing. In the parts of the charcoal layer above the hot regeneration zone the waste heat of the oxidation products is transferred to the charcoal to be regenerated thus driving off by thermal decomposition a part of the impurities.

In order to start the regeneration one may also pass preheated air through the charcoal layer and add steam or other diluting gases to the air, when the combustion temperature is reached.

When regenerating charcoals requiring higher temperatures for starting the oxidation one may place a layer of more easily oxidizable substances such as charcoal loaded with substances of very low kindling point below the charcoal to be regenerated or at those places of the charcoal layer, where the treating gases enter the regenerator.

It is not necessary, that the temperature of the treating gases entering the regenerator should exceed during the entire treating process the temperature, at which the oxidation of the impurities starts. When the regeneration process is once started the temperature of the entering treating gases may be decreased for example, when using steam, down to a temperature, at which steam is just condensed. When using mixtures of air and carbon dioxide or other gas mixtures the treating gases may enter the regenerator at room temperature, when the oxidation is once started by using suitably heated treating gases. It is advisable to use oxygen concentrations as high as possible and temperatures of the entering treating gases as low as possible, preferably between 120° and 250° C.

The new regeneration method can also be carried on continuously. This can be accomplished by moving the carbon to be regenerated or already in the process of regeneration in the regeneration vessel to a discharge opening, for instance at the bottom of the vessel, the speed of motion being necessarily so regulated that only completely regenerated carbon leaves the discharge opening. In the amount that regenerated carbon leaves the receptacle, more carbon must be added at the top. It is, of course, important in this method also that the movement of the mass in the receptacle is effected without agitation of the mass itself.

It is in many cases advisable to subject the charcoal to be regenerated to a preliminary regeneration or purification by treating it with solvents suitable for dissolving a part of the impurities taken up by the charcoal. If the charcoal contains organic impurities, which are not converted into gaseous products by the described oxidation process, the charcoal may be treated with acids or alkaline reacting solutions and washed with water before or after the regeneration method described.

Example

Active charcoal which after use for recovering benzene from illuminating gas has lost about 80% of its original adsorbing power is filled into a simple container until a charcoal layer of about 1 meter height is obtained. Superheated steam is passed through this charcoal layer, until the temperature of the charcoal at the place where the steam enters the charcoal layer has reached about 180° C. Then about 25% by volume of air is added to the steam. The oxidation of the impurities adsorbed by the charcoal sets in at once and the temperature is raised quickly in the reaction zone formed. By lowering the amount of air in the treating gas mixture to about 15% by volume a temperature of about 500 to 600° C. is obtained and kept constant. The temperature of the steam air mixture entering the charcoal layer is slowly decreased to about 100–110° C. The high temperature zone travels through the charcoal layer. When the regeneration is finished the charcoal has regained substantially its original adsorbing power. The losses in charcoal by oxidation are about 5%.

In the foregoing specification and appended claims the terms "gas" and "gas mixture" are intended to comprise also vapors, or mixtures of vapors, or of gases with vapors of all kinds, particularly steam.

I claim:

1. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal, the temperature of the introduced gas mixture at least after beginning of the process not substantially exceeding 250° C.

2. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal, the temperature of the introduced gas mixture at least after beginning of the process being between about 120° and 250° C.

3. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal, the gas mixture at least after beginning of the process being at least in part below 120° C.

4. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal in a zone progressively advancing from the place of entrance of the oxygen-containing gases to the place of exit, by means of the heat developed by the oxidation reaction.

5. A method of regenerating spent active charcoal in lump form such as granules containing oxidizable impurities which comprises treating the charcoal in bulk without agitation or external heating with a preheated gas mixture containing free oxygen in an amount less than 10% by volume at a temperature at which the impurities are destroyed without substantial oxidation of the charcoal, the temperature of the gas mixture at least after beginning of the process not substantially exceeding 250° C.

6. A method of regenerating spent active charcoal in lump form such as granules containing oxidizable impurities which comprises treating the charcoal in bulk without agitation or external heating with a preheated gas mixture containing free oxygen in an amount less than 10% by volume and steam at a temperature at which the impurities are destroyed without substantial oxidation of the charcoal, the temperature of the gas mixture at least after beginning of the process not substantially exceeding 250° C.

7. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal in a zone progressively advancing from the place of entrance of the oxygen-containing gases to the place of exit, by means of the heat developed by the oxidation reaction, the charcoal being first heated at least at the place of entrance of the preheated oxygen-containing gas to a temperature at which the oxidation reaction will take place and thereafter introducing the oxygen-containing gas, the temperature in the regeneration zone being regulated by suitable adjustment of the introduction of oxygen.

8. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal, the charcoal being first heated by means of preheated gas at the place of entrance of the oxygen-containing gas, to a temperature at which the oxidation reaction by the introduced oxygen-containing gas will take place and thereafter the temperature in the regeneration zone being regulated by suitable adjustment of the introduction of oxygen.

9. A method as defined in claim 8 in which charcoal to be regenerated and relatively easily oxidizable substances are positioned at the place of entrance of the oxygen-containing gas.

10. A method of regenerating spent active charcoal in lump form such as granules containing oxidizable impurities which comprises treating the charcoal in bulk without agitation or external heating with a preheated gas mixture containing free oxygen at a temperature at which the impurities are destroyed without substantial oxidation of the charcoal, the charcoal being first raised to a relatively low temperature with superheated steam, the temperature at the place of entrance of the gases being then raised to the point at which oxidation begins by admixing a gas containing free oxygen with the steam, and the temperature being thereafter regulated by suitable adjustment of introduction of oxygen.

11. A method as defined in claim 7 in which the gas mixture is at first preheated to temperature not substantially over 250° C. and thereafter its temperature is decreased.

12. A method of regenerating spent active charcoal in lump form such as granules containing oxidizable impurities which comprises treating the charcoal in bulk without agitation or external heating with a preheated gas mixture containing free oxygen in an amount less than 10% by volume and steam at a temperature at which the impurities are destroyed without substantial oxidation of the charcoal, the charcoal at the place of entrance of the gaseous mixture being heated before the introduction of the gas mixture to a temperature at which the oxidation reaction will take place, the gas mixture then being introduced at a temperature not substantially above 250° C., and the temperature of the mixture thereafter being decreased nearly to the point of condensation of the steam.

13. A method as defined in claim 1 in which the gas mixture is passed from the bottom up through the charcoal and the charcoal is moved downwardly in bulk without agitation at a speed corresponding to the rate of progress of the reaction zone.

14. A method as defined in claim 1 in which the process is carried out in the adsorption vessel.

15. A method as defined in claim 1 in which the active charcoal is also treated with agents adapted to dissolve part of the impurities from the charcoal.

16. A method as defined in claim 1 in which the active charcoal is also treated with inorganic agents adapted to dissolve part of the impurities from the charcoal.

In testimony whereof I affix my signature.

ANTON MACKERT.